Dec. 19, 1939.                F. BUSSE                2,183,764
                   PHOTOGRAPHIC ENLARGING APPARATUS
                         Filed Dec. 7, 1937
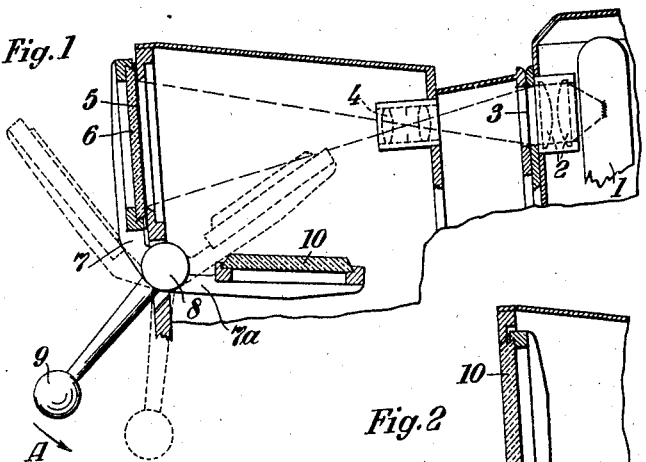
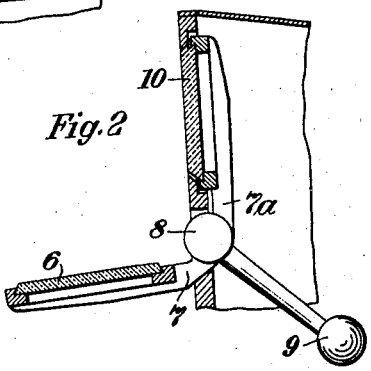
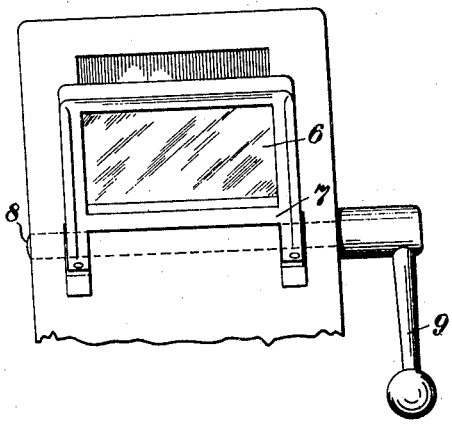
INVENTOR.
Ferdinand Busse
BY Philip S. Hopkins
ATTORNEY.

Patented Dec. 19, 1939

2,183,764

UNITED STATES PATENT OFFICE 2,183,764

PHOTOGRAPHIC ENLARGING APPARATUS

Ferdinand Busse, Munich, Germany, assignor, by mesne assignments, to Agfa Ansco Corporation, Binghamton, N. Y., a corporation of Delaware Application December 7, 1937, Serial No. 178,479
In Germany December 7, 1936

1 Claim. (Cl. 88—24)

This invention relates to a photographic enlarging apparatus.

One of its objects is the provision of an improved photographic enlarging apparatus comprising a matt plate. Further objects of the invention will be apparent from the detailed specification following hereinafter.

In working with photographic enlarging apparatus it is usual and indeed necessary to observe the enlarged negative image before exposure of the light-sensitive paper for the purpose of examination, sharp focussing and so on. Since this operation must be performed in a light which does not affect the photographic paper in position on the supporting plate a yellow or red filter disc is inserted in the path of the rays in the enlarging apparatus. The image formed in the enlargement plane through such a filter can only with difficulty, however, be focussed sharply, examined and judged with respect to the necessary time of exposure, gradation of the photographic paper and so on owing to the strong decrease in the intensity of illumination caused by the filter. These disadvantages do not exist if the enlarged image can be rendered visible as a transparency on a matt plate.

According to this invention the enlarged image of the negative formed in the enlargement plane in an enlarging apparatus is received on a matt plate or the like which is interchangeable with a plate carrying the photographic paper on which the enlargement is to be printed. Advantageously the matt plate and the plate carrying the paper are rigidly connected by an angular carrier. This carrier is pivotally mounted on an axis situated close to the image plane and can easily be actuated by a handle so that the plate supporting the paper can be brought without any trouble into the position occupied by the matt plate and vice versa.

Reference is made to the accompanying drawing in which an apparatus constructed in accordance with the invention is illustrated by way of example.

Figure 1 is a partial vertical section of an enlarging apparatus showing in the position for illumination the plate by which the paper is pressed against the enlarging frame.

Figure 2 shows the position of the plate supporting the paper when the matt plate occupies the image plane and Figure 3 is a view of the plate carrier in an intermediate position as viewed in the direction of the optical axis of the illumination system.

The light rays emanating from the source of light 1 are projected on to or through the negative 3 by means of a condenser 2. An enlarged image of the negative 3 is projected by means of the objective 4 in the image plane 5 in which plane the photographic paper is held by the pressure plate 6. The pressure plate 6 is mounted on an angular carrier 7, 7a, which can be rotated to and fro about the axis 8 by means of a handle 9. A matt plate 10 is mounted on the part 7a of the carrier 7 which is nearer to the objective. When it is desired to inspect the enlarged negative the matt plate 10 is moved into the image plane as shown in Figure 2. The pressure plate 6 may also be formed as a transparent or matt plate in order that during the illumination of the paper the image may be observed and examined and if necessary parts of the image may be less exposed. In this manner also one has a control over the switching on and off of the light by the printing clock.

What I claim is:

A photographic enlarger comprising means for projecting an enlarged image to a fixed image plane, a unitary carrier having extensions disposed at substantially right angles to each other, said carrier being pivoted substantially at its center adjacent the fixed image plane, a platen for photographic material on one of said extensions and a viewing screen on the other of said extensions, and means for rocking said carrier on its pivot to selectively bring said platen and said screen into said image plane, each extension moving out of alignment with said plane as the other moves into the plane, said platen also being transparent for viewing a projected image therethrough.

FERDINAND BUSSE.